(12) United States Patent
Janani et al.

(10) Patent No.: US 11,070,416 B2
(45) Date of Patent: Jul. 20, 2021

(54) TIME DOMAIN APPROACH TO DETERMINING A MODULATION OR DEMODULATION IMBALANCE

(71) Applicant: Apple Inc., Cupertino, CA (US)

(72) Inventors: Mohammad Janani, San Jose, CA (US); Carlos H. Arrabal Azzalini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/582,796

(22) Filed: Sep. 25, 2019

(65) Prior Publication Data

US 2021/0091992 A1 Mar. 25, 2021

(51) Int. Cl.
*H04L 27/36* (2006.01)
*H04B 17/345* (2015.01)
*H04B 17/19* (2015.01)

(52) U.S. Cl.
CPC .......... *H04L 27/366* (2013.01); *H04B 17/19* (2015.01); *H04B 17/345* (2015.01)

(58) Field of Classification Search
CPC ... H04L 27/366; H04L 27/38; H04L 27/3863; H04B 17/19; H04B 17/345
See application file for complete search history.

(56) References Cited

U.S. PATENT DOCUMENTS

| | | | |
|---|---|---|---|
| 7,298,222 B2 | 11/2007 | Rosik et al. | |
| 7,349,677 B2 | 3/2008 | Jensen | |
| 7,567,611 B2 | 7/2009 | Chien | |
| 7,995,645 B2 | 8/2011 | Lee et al. | |
| 2006/0067425 A1* | 3/2006 | Windisch | H03F 1/3241 375/296 |
| 2010/0232490 A1* | 9/2010 | Balakrishnan | H03D 3/009 375/227 |
| 2011/0189947 A1* | 8/2011 | Miller | H04B 7/2041 455/12.1 |
| 2015/0117577 A1* | 4/2015 | Valadon | H04B 1/1027 375/350 |
| 2019/0190451 A1* | 6/2019 | D'Alessandro | H03B 27/00 |

* cited by examiner

*Primary Examiner* — Janice N Tieu
(74) *Attorney, Agent, or Firm* — Fletcher Yoder PC (57) ABSTRACT

An electronic device discussed herein may include an imbalance compensation logic that determines an imbalance parameter based at least in part on received quadrature signals from quadrature generation circuitry. The imbalance parameter may be determined using noise received by a receiver as an input radio frequency signal. By using the systems and methods described herein, an accuracy of detecting the imbalance may improve. Furthermore, by including the imbalance compensation logic internal to the electronic device, the imbalance compensation logic may provide continued imbalance detection over a lifespan of the electronic device.

20 Claims, 8 Drawing Sheets

TIME DOMAIN APPROACH TO DETERMINING A MODULATION OR DEMODULATION IMBALANCE

BACKGROUND

The present disclosure relates generally to electronic devices, and more particularly, to electronic devices that utilize radio frequency signals, transmitters, and receivers in various processes, such as cellular and wireless device processes.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transmitters and/or receivers are commonly included in various electronic devices, and particularly, portable electronic communication devices, such as phones (e.g., mobile and cellular phones, cordless phones, personal assistance devices), computers (e.g., laptops, tablet computers), internet connectivity routers (e.g., Wi-Fi routers or modems), radios, televisions, or any of various other stationary or handheld devices. In some embodiments of electronic devices, a transmitter and a receiver are combined to form a transceiver. Transceivers may transmit and/or receive wireless signals by way of an antenna coupled to the transceiver. Specifically, a wireless transceiver may wirelessly communicate voice and/or data over a network channel or other medium (e.g., air) to and from one or more external wireless devices.

Wireless data communication may involve transmitting and/or receiving carrier signals (e.g., radio frequency (RF) signals) indicative of the data. Transceivers may be installed on a printed circuit board (PCB) with signal processing circuitry associated with processing a carrier signal before and/or after wireless transmission into the air. A transceiver may include RF circuitry (e.g., Wi-Fi and/or LTE RF circuitry, front end circuitry) that is used, for example, to support transmission and/or reception of RF signals that follow various wireless communication standards or additional communication standards.

Components of the transceiver, however, may cause the RF signals to incur a certain amount of delay, such as asymmetrical phase delays, prior to transmission or after reception. The delay introduced to the signals may permit one signal to be considered an in-phase signal (e.g., I signal) and another signal to be considered a quadrature signal (e.g., Q signal). This may be done via a quadrature generation circuitry. However, due to manufacturing variabilities and component aging over time, the delay introduced may vary from a set point or a desired amount of delay, which may decrease an accuracy of information recovered from the RF signals.

During manufacturing, this imbalance may be detected and compensated for through an imbalance compensation logic. Some imbalance detection operations may detect imbalance of the quadrature generation circuit using testing signals. However, generating and applying the testing signals may require using specialized equipment (e.g., external to the transceiver) in a controlled environment with access to the components of the transceiver associated with the imbalance.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various embodiments of the present disclosure may be useful in receiving and supporting data signals wirelessly transmitted through radio frequency (RF) signals. By way of example, an electronic device may include a transceiver to transmit and/or receive the RF signals over one or more frequencies of a wireless network. The transmitter may include a variety of circuitry, for example, processing circuitry to modulate a data signal onto a carrier wave to generate an RF signal. The transmitter may also include power circuitry, such as a power amplifier (e.g., amplifying circuitry), to increase a power level of the RF signal so that it is able to be effectively transmitted into the air via an antenna. Some electronic devices may have the variety of circuitry of the transceiver disposed on different, stacked PCBs. The information to be transmitted typically is modulated onto the RF signal prior to wireless transmission. In other words, the information to be transmitted is typically embedded in an envelope of a carrier signal that has a frequency in the RF range. The envelope is typically referred to as the baseband signal. To embed or extract the information in or from the envelope of the carrier signal, modulation or demodulation may be performed on the carrier signal using quadrature signals, often referred to as IQ signals. For example, the receiving device may demodulate the signal (e.g., remove the carrier signal) to recover the embedded information in the envelope.

In an envelope tracking system, a delay mismatch between the IQ signals may degrade system performance in terms of error vector magnitude (EVM) measurements of the signal. Such delay mismatch may cause the supply voltage to be too high, in which the case the linearization achieved by shaping the envelope is lost, or too low, in which case the signal is clipped by the power amplifier. In either case, a high EVM may reduce the quality of the transmitted signal and generally causes the transmitting device to consume more power than necessary.

A transceiver may include imbalance compensation logic that determines an imbalance parameter based at least in part on received quadrature signals from quadrature generation circuitry. The imbalance compensation logic may determine the imbalance parameter using noise received by the transceiver or receiver as an input radio frequency signal. By including the imbalance compensation logic internal to the electronic device, the imbalance compensation logic may provide continued imbalance detection over a lifespan of the electronic device, thus enabling real-time and dynamic compensation of the imbalance.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure generally relate to a transceiver of an electronic device that receives and/or transmits wireless data signals, such as radio frequency (RF) signals. The transceiver may include imbalance compensation logic that determines an imbalance parameter based at least in part on received quadrature signals from quadrature generation circuitry. The imbalance compensation logic may be internal to at least the transceiver or receiver. The imbalance parameter may be determined using noise received by the transceiver or receiver as an input radio frequency signal. By using the systems and methods described herein, an accuracy of detecting the imbalance may improve to an accuracy level at least as low as −50 decibels (e.g., −60 decibels) and the detection of the imbalance may be performed in the time domain. With the foregoing in mind, a general description of suitable electronic devices that may include such a transceiver is provided below.

Figure 1:
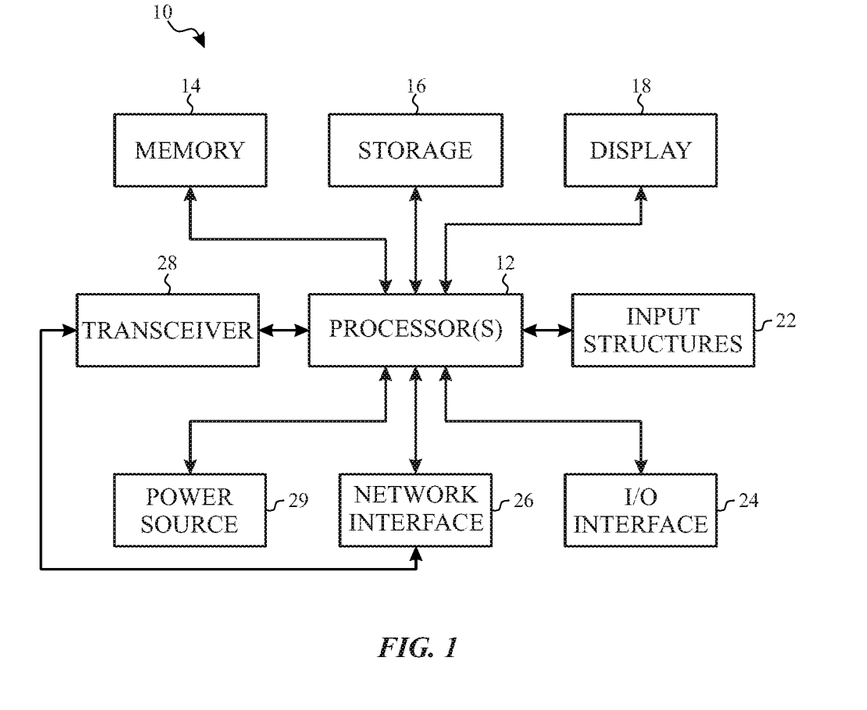
FIG. 1 is a schematic block diagram of an electronic device including a transceiver, in accordance with an embodiment.

Turning first to FIG. 1, an electronic device 10 according to an embodiment of the present disclosure may include, among other things, one or more of processor(s) 12, memory 14, nonvolatile storage 16, a display 18, input structures 22, an input/output (I/O) interface 24, a network interface 26, a transceiver 28, and a power source 29. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by a processor and may cause the processor to perform operations as described herein. It should be noted that FIG. 1 is merely one example of a particular embodiment and is intended to illustrate the types of elements that may be present in the electronic device 10.

Figure 2:
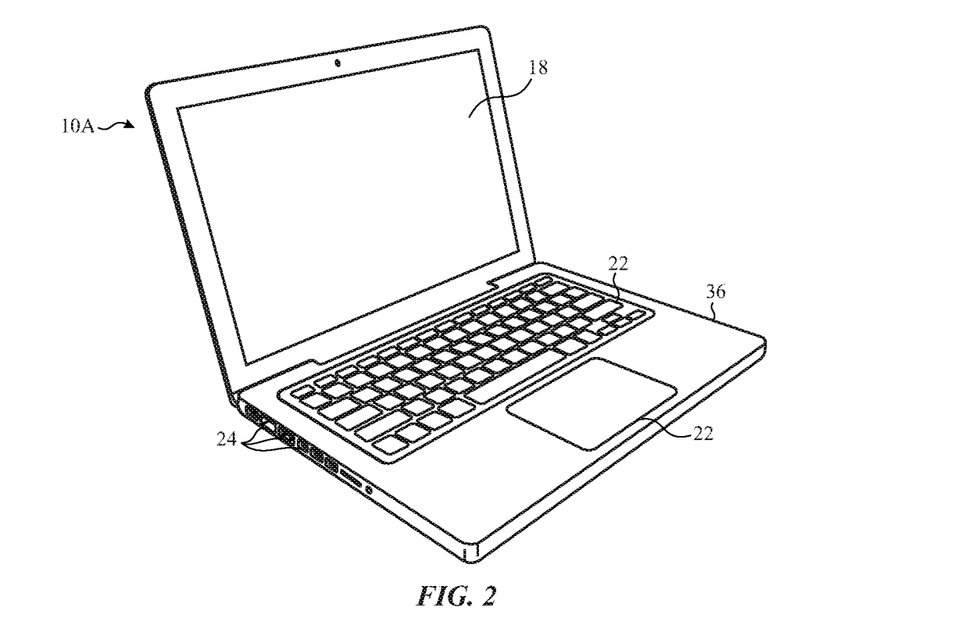
FIG. 2 is a perspective view of a notebook computer representing a first embodiment of the electronic device of FIG. 1, in accordance with an embodiment.
Figure 3:
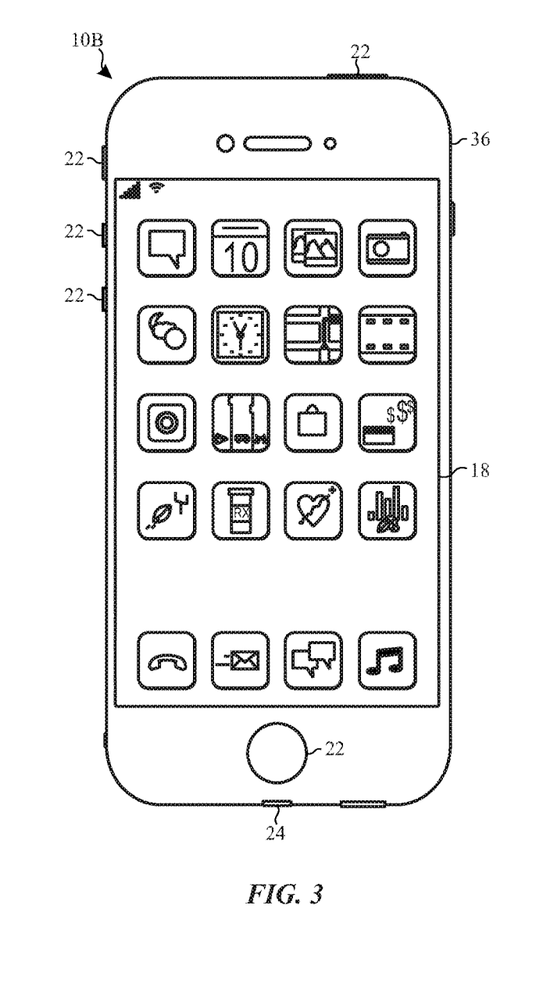
FIG. 3 is a front view of a hand-held device representing a second embodiment of the electronic device of FIG. 1, in accordance with an embodiment.
Figure 4:
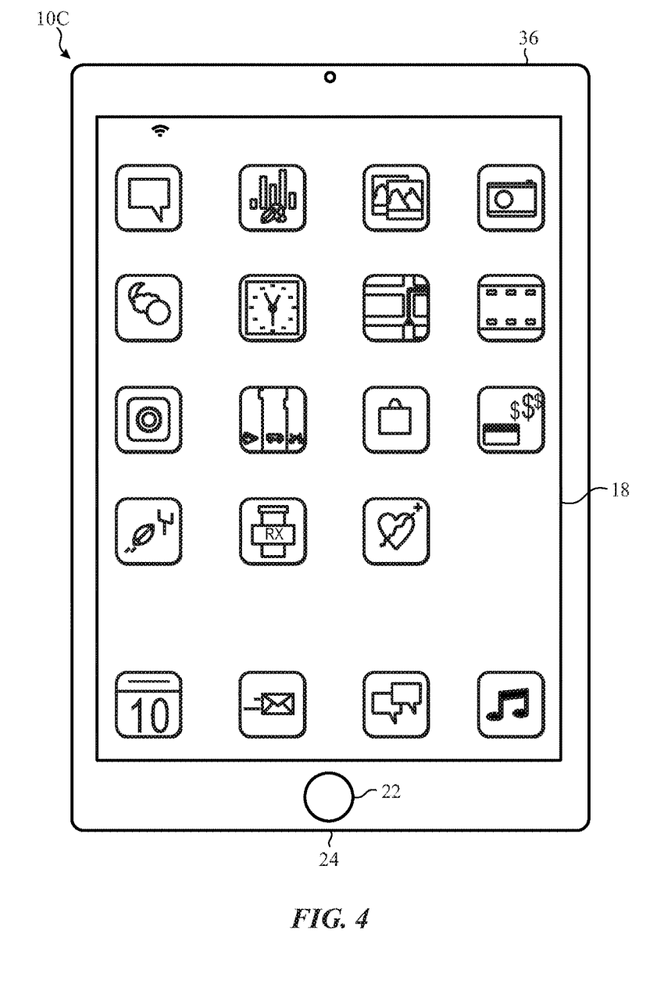
FIG. 4 is a front view of another hand-held device representing a third embodiment of the electronic device of FIG. 1, in accordance with an embodiment.
Figure 5:
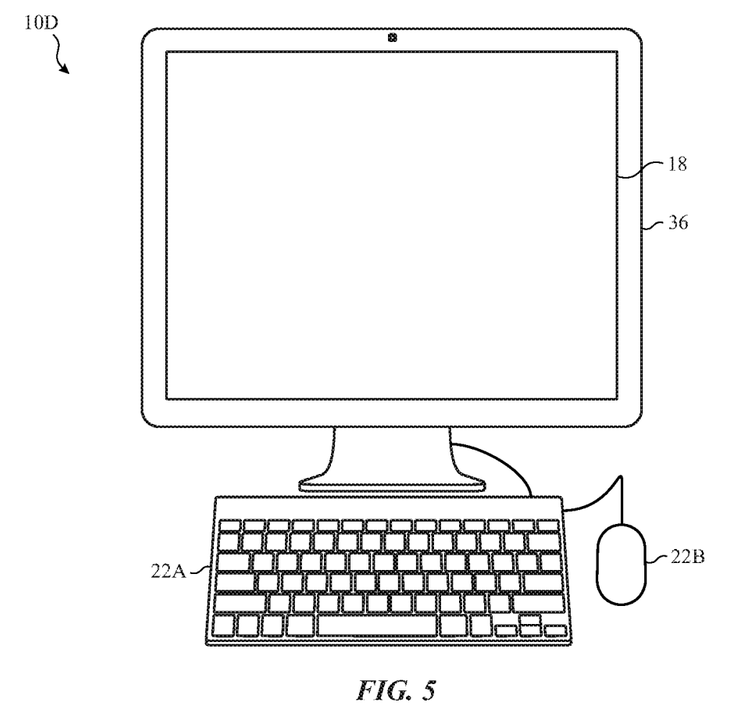
FIG. 5 is a front view of a desktop computer representing a fourth embodiment of the electronic device of FIG. 1, in accordance with an embodiment.
Figure 6:
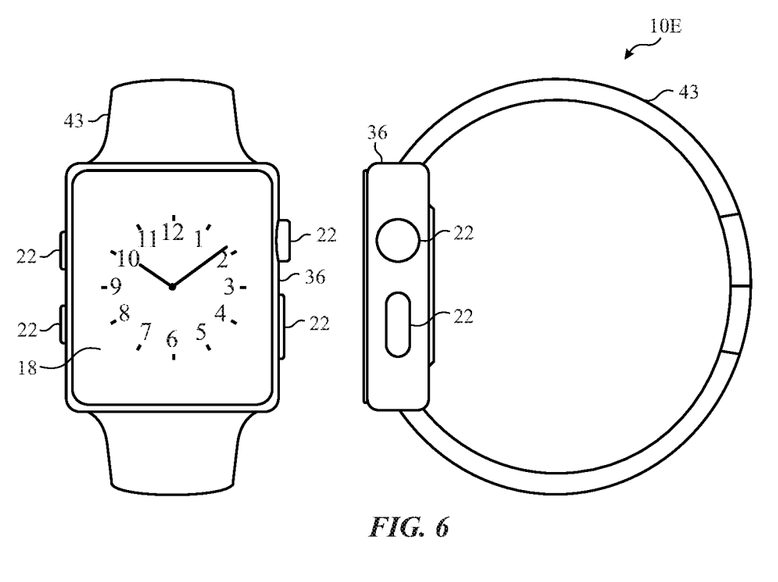
FIG. 6 is a front view and side view of a wearable electronic device representing a fifth embodiment of the electronic device of FIG. 1, in accordance with an embodiment.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may operably couple with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, long term evolution (LTE) cellular network, or long term evolution license assisted access (LTE-LAA) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth.

In some embodiments, the electronic device 10 communicates over the aforementioned wireless networks (e.g., Wi-Fi, WiMAX, mobile WiMAX, 4G, LTE, and so forth) using the transceiver 28. The transceiver 28 may include circuitry useful in both wirelessly receiving and wirelessly transmitting signals (e.g., data signals, wireless data signals, wireless carrier signals, RF signals), such as a transmitter and/or a receiver. Indeed, in some embodiments, the transceiver 28 may include a transmitter and a receiver combined into a single unit, or, in other embodiments, the transceiver 28 may include a transmitter separate from a receiver. The transceiver 28 may transmit and receive RF signals to support voice and/or data communication in wireless applications such as, for example, PAN networks (e.g., Bluetooth), WLAN networks (e.g., 802.11x Wi-Fi), WAN networks (e.g., 3G, 4G, and LTE and LTE-LAA cellular networks), WiMAX networks, mobile WiMAX networks, ADSL and VDSL networks, DVB-T and DVB-H networks, UWB networks, and so forth. As further illustrated, the electronic device 10 may include the power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a standard connector and protocol, such as the Lightning connector provided by Apple Inc. of Cupertino, Calif., a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features and/or an audio speaker to provide audio output associated with audio playback. In some cases, the input structures 22 include a headphone input port to electrically couple hardware of the handheld device 10B to externally coupled speakers and/or headphones of a user, such as to provide an audio output associated with audio playback.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, Calif. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an Apple Watch® by Apple Inc. of Cupertino, Calif. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E.

Figure 7:
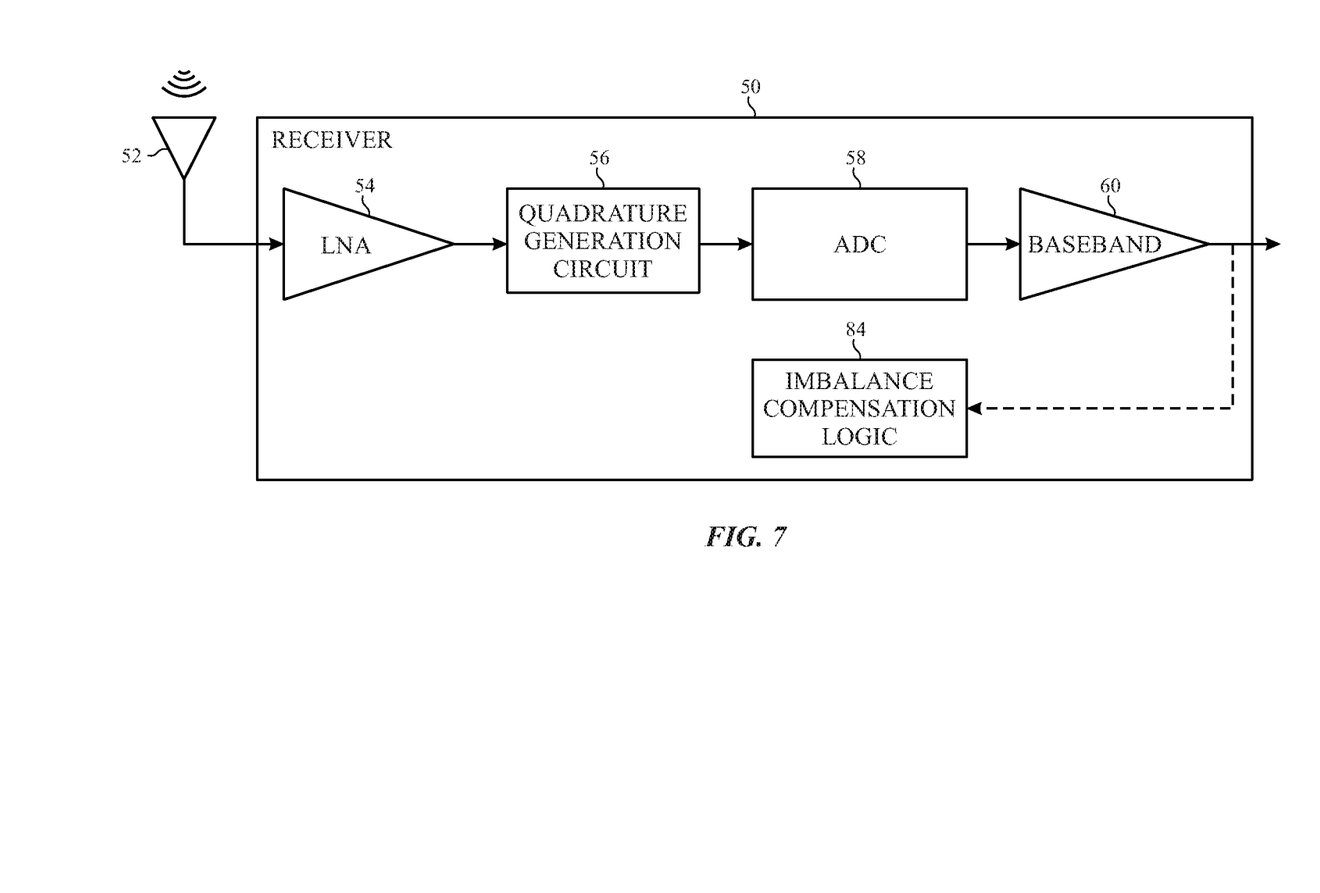
FIG. 7 is a block diagram of a receiver of the transceiver of FIG. 1, in accordance with an embodiment.

In certain embodiments, as previously noted above, each embodiment (e.g., notebook computer 10A, handheld device 10B, handheld device 10C, computer 10D, and wearable electronic device 10E) of the electronic device 10 may include the transceiver 28. With the foregoing in mind, FIG. 7 depicts a schematic block diagram of an embodiment of a receiver 50 within the transceiver 28. In the illustrated embodiment, the receiver 50 is separate from the transmitter within the transceiver 28, but in some embodiments, the transceiver 28 may include a receiver 50 and a transmitter combined into a single unit. Further, the various functional blocks shown in FIG. 7 may include hardware elements (including circuitry), software elements (including computer code stored on a computer-readable medium) or a combination of both hardware and software elements. It should also be noted that FIG. 7 is merely one example of a particular implementation and is intended to illustrate the types of components that may be present in the receiver 50. As such, functional blocks may be added or omitted, and their arrangement within the receiver 50 may be modified.

In some embodiments, the receiver 50 may receive an input signal that, after some modifications, is transmitted wirelessly and received via an antenna 52 operably connected to a low noise power amplifier (LNA) 54. The LNA 54 may receive a relatively low-power signal from the antenna 52 and increase its magnitude without significantly increasing noise of the power signal, generating a modified input signal. The receiver 50 may regulate power supplied to the LNA 54 according to average power tracking of the modified input signal or envelope tracking of the input signal.

A quadrature generation circuit 56 may receive the modified input signal. The modified input signal may be a carrier waveform that transmits information via modulation of its frequency, amplitude, or the like. During wireless transmission, data may be stored and transmitted via a carrier waveform, and, in particular, via encoding of data by selective modulation of the carrier waveform. Thus, when receiving the input signal, the receiver 50 may receive an amplitude-modulated signal and/or a frequency-modulated signal indicative of data transmitted by a transmitter of another device. The receiver 50 may use the quadrature generation circuit 56 to separate the carrier waveform into component signals as part of a demodulation operation.

Signals output from the quadrature generation circuit 56 may be transmitted to an analog-to-digital converter (ADC) 58. The ADC 58 may use any suitable conversion method to convert the output from the quadrature generation circuit 56 into digital data usable by the electronic device 10. In some embodiments, a baseband filter 60 may receive an output from the ADC 58 to perform additional processing on the initial data recovered from the carrier waveform.

During the recovery of the data from the carrier waveform, the quadrature generation circuit 56 may generate two signals from the carrier waveform. In some cases, the recovery operation yields imbalanced signals that are not 90 degrees)(° out of phase (e.g., greater than or less than 90° out of phase). During manufacturing, this imbalance may be detected and compensated for using an imbalance compensation logic. Some imbalance detection operations may detect imbalance of the quadrature generation circuit 56 using testing signals. However, generating and applying the testing signals may require using specialized equipment (e.g., external to the transceiver) in a controlled environment with access to the components of the transceiver associated with the imbalance. As such, using noise received by the receiver 50 (e.g., received via antenna 52, received via internal electrical couplings) to detect the imbalance, instead of testing signals, may avoid the need to use such specialized equipment and requiring access to the components of the transceiver associated with the imbalance.

Figure 8:
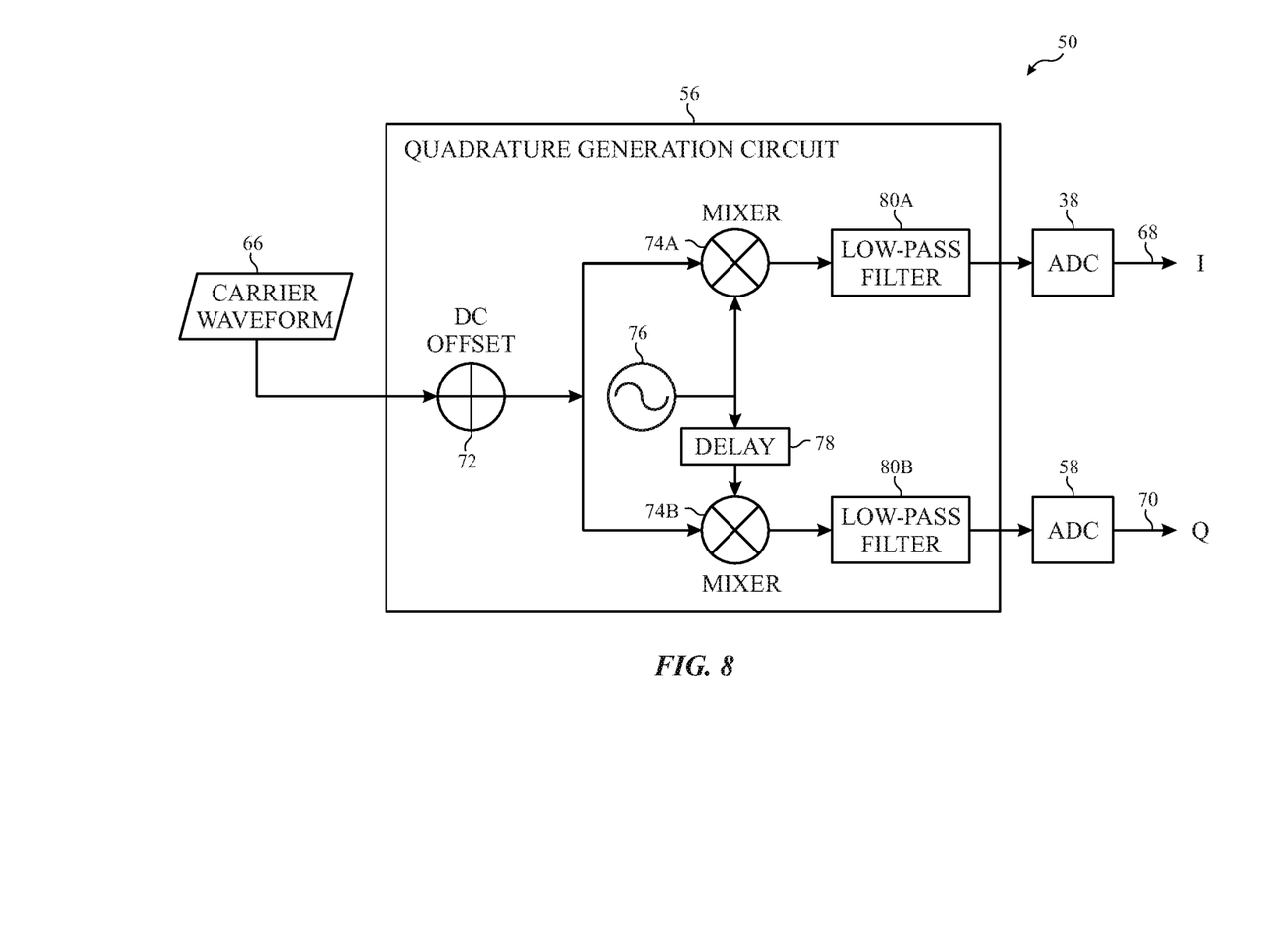
FIG. 8 is a block diagram of a quadrature generation circuit of the receiver of FIG. 7, in accordance with an embodiment.

To elaborate, FIG. 8 is a block diagram of an example quadrature generation circuit 56 of the receiver 50. The receiver 50 may receive a carrier waveform 66 via the antenna 52. After amplification, the carrier waveform 66 may be transmitted to the quadrature generation circuit 56 to be separated into component signals transmitted via an in-phase (I) signal path 68 and a quadrature (Q) signal path 70.

As illustrated, the carrier waveform 66 may be transmitted to a direct current (DC) offset circuit 72. The DC offset circuit 72 may increase or decrease an average of the carrier waveform 66 by a constant offset value. The constant offset value may be set via a variety of methods, including a value of a voltage supplied to the DC offset circuit 72.

From the DC offset circuit 72, the resulting offset carrier waveform 66 is transmitted (e.g., substantially simultaneously) to mixer circuitry 74A, 74B. There, the phase of the offset carrier waveform 66 is mixed with an input waveform 76 to generate mixed carrier waveforms 66. Mixed carrier waveforms 66 may be considered quadrature signal components (e.g., a first signal component including quadrature signals and a second signal component including in-phase signals). For the Q signal path 70, the input waveform 76 is delayed via delay circuit 78 before being used in phase mixing of the offset carrier waveform 66. After phase mixing, signals output from the mixer circuitry 74A, 74B may transmit through low-pass filters 80A, 80B to eliminate some noise and/or perform additional processing before being used by the ADC 58. It is noted that each of the depicted components may be combined or included separately within electronic device 10. For example, the low-pass filter 80A, 80B may be included in a single low-pass filter.

Signals transmitted via the Q signal path 70 are desired to be lagging or leading (e.g., out-of-phase relative to) signals of the I signal path 68 by 90 degrees (°). Thus, the delay circuit 78 may be set to delay the input waveform 76 by 90° to result in delayed signals transmitted via the Q signal path 70. However, in actual operation, the delay between the quadrature signals (e.g., signals of the I signal path 68 and the Q signal path 70), after signals on the Q signal path 70 are delayed by the delay circuit 78, may not be exactly 90° due to the I signal path 68 and the Q signal path 70 having asymmetric signal pathing. For example, aging of components, manufacturing inconsistencies, or the like, may cause signals to travel on the I signal path 68 for a time that is different (e.g., longer or shorter) than the time it takes for signals to travel on the Q signal path 70. The travel time imbalance between the signals of the I signal path 68 and of the Q signal path 70 may be referred to herein as IQ imbalance.

Referring now back to FIG. 7, an imbalance compensation logic 84 may be used when compensating for at least a portion of the IQ imbalance. The imbalance compensation logic 84 may be a processing circuit operable to determine IQ imbalance parameters and to use the IQ imbalance parameters to adjust a delay implemented via the delay circuit 78. The imbalance compensation logic 84 may be internal or external to the receiver 50. In this way, the imbalance compensation logic 84 may be used during a time of manufacturing of the electronic device 10 (e.g., during a validation operational step of a manufacturing process to compensate for component manufacturing variances) and/or during operation or after manufacturing of the electronic device 10 (e.g., to compensate for component aging). Furthermore, the imbalance compensation logic 84 may use noise associated with the receiver 50 to determine the IQ imbalance parameters instead of a test signal, though, in alternative or additional embodiments, the disclosed systems and methods may be used with a test signal. It is noted that as used herein, logic of the imbalance compensation logic 84 may be software (e.g., instructions executable by a processor), hardware (e.g., circuitry), or a combination of the two.

Figure 9:
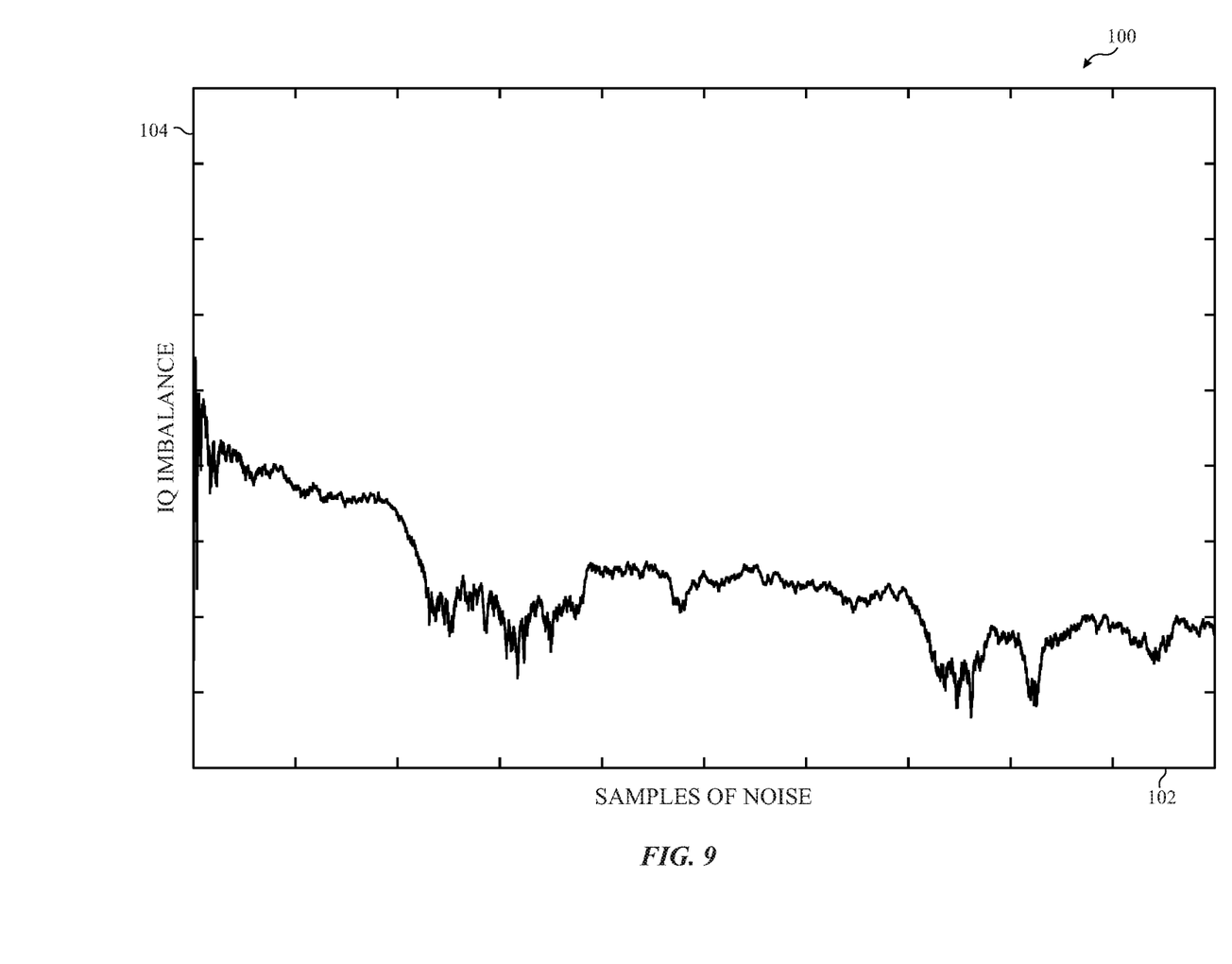
FIG. 9 is a graph that illustrates an example of how implementing the systems and methods described herein may affect an imbalance estimation error over time, in accordance with an embodiment.

With the foregoing in mind, FIG. 9 is a graph 100 that illustrates an example of how implementing the systems and methods described herein, including the receiver 50 of FIG. 7 and/or the quadrature generation circuit 56 of FIG. 8, may affect an IQ imbalance estimation error over time. The graph 100 includes an axis 102 indicating a number of samples of noise and an axis 104 indicating a determined amount of IQ imbalance for the sample. As time increases (e.g., as sampling continues), the overall IQ imbalance decreases when using the systems and methods described herein. Decreases in the IQ imbalance may result in improvements to operation of the receiver 50.

Figure 10:
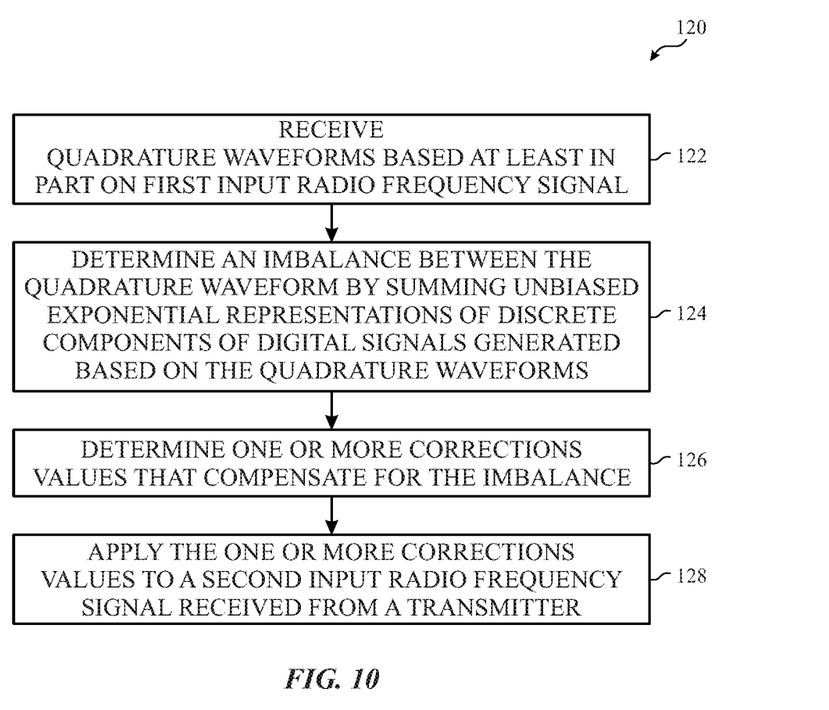
FIG. 10 is a flow chart illustrating a method that determines an imbalance between a signal paths of the receiver of FIG. 7 to determine a correction to compensate for the IQ imbalance, in accordance with an embodiment.

To help elaborate, FIG. 10 is a flow chart illustrating a method 120 that determines an IQ imbalance between the I signal path 68 and the Q signal path 70 to determine a correction to compensate for the IQ imbalance, according to embodiments of the present disclosure. In some embodiments, the method 120 may be implemented at least in part by executing instructions stored in a tangible, non-transitory, computer-readable medium, such as the memory 14, using processing circuitry, such as processors 12, or the like. However, as described herein, the method 120 is described as being performed by the imbalance compensation logic 84.

During testing or sampling operations, at block 122, the imbalance compensation logic 84 may receive quadrature waveforms generated based at least in part on a first input radio frequency signal from a transmitter (e.g., carrier waveform 66). The first input radio frequency signal may be noise of the receiver 50 (e.g., noise of the receiving operational chain), a carrier waveform generated and transmitted as a test signal, and/or a carrier waveform associated with data or information transmission. In this way, an input carrier waveform 66 having any wavelength may be used in the methods described herein. In some examples, the receiver 50 may be instructed by the imbalance compensation logic 84 to enter into an operational mode that involves operating the antenna into a maximum gain operation, as such to maximize the amount of noise gathered for use in the operations described by the method 120.

At block 124, the imbalance compensation logic 84 may determine an imbalance between the quadrature waveforms. The imbalance compensation logic 84 may use the digital signals of the quadrature waveforms to generate unbiased exponential representations of discrete components of the quadrature waveforms. Additional details regarding operations of block 124 are described with FIG. 11. In general, the imbalance compensation logic 84 leverages a relationship between the discrete components of the quadrature waveform and a conjugate of the discrete components of the quadrature waveform to determine an imbalance parameter used to calculate a phase and magnitude of the imbalance between the I signal path 68 and the Q signal path 70.

At block 126, the imbalance compensation logic 84 may determine one or more correction values that compensate for the imbalance determined at block 124 that, when applied, may result in a desirable phase shift (e.g., 90°) between the quadrature waveforms. In particular, the delay circuit 78 may apply the correction values to compensate for the determined imbalance.

At block 128, the imbalance compensation logic 84 may apply the determined correction values to compensate for the determined imbalance. After compensation, signals transmitted via the I signal path 68 and signals transmitted via the Q signal path 70 may be out-of-phase by 90°. It is noted that these systems and methods may be used to phase shift signals transmitted via the Q signal path 70 to be out-of-phase from the I signal path 68 by any suitable degree or phase shift. Adjustments applied to the receiver 50 based on the imbalance parameter may alter processing of a carrier waveform 66 received at a later time than the first input radio frequency signal. For example, a second input radio frequency signal may be received as the carrier waveform 66 and be subjected to processing operations of the receiver 50 based at least in part on the imbalance parameters determined at the block 124. In some cases, the imbalance compensation logic 84 may determine a phase adjustment to be applied to the delay circuit 78 of the quadrature generation circuit 56 in response to a particular combination of a phase of the imbalance and/or a magnitude of the imbalance.

Referring back to block 124, the imbalance compensation logic 84 may determine imbalance parameters that characterize the imbalance (e.g., IQ imbalance) and thus may be used in operations of block 126 to determine one or more correction values. The imbalance parameters may be determined using the systems and methods described via FIG. 11.

Figure 11:
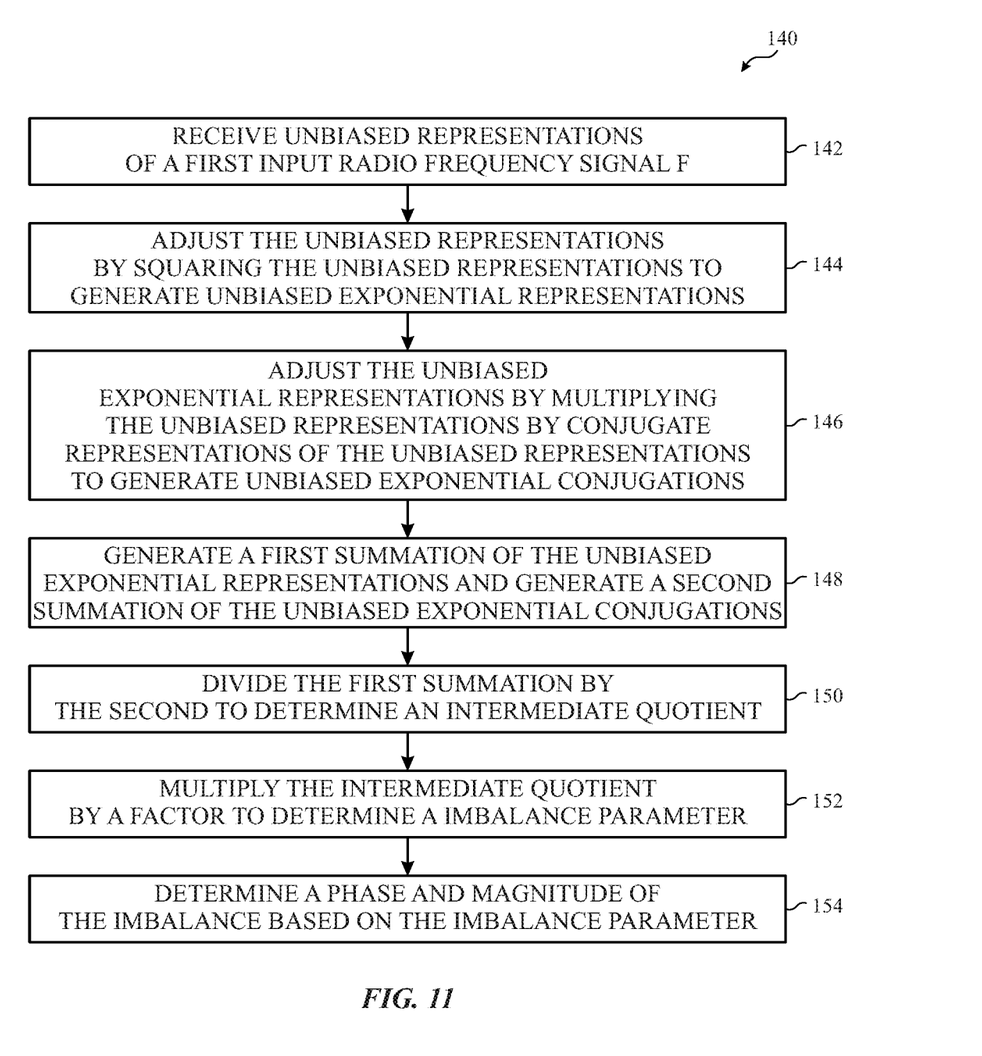
FIG. 11 is a flow chart illustrating a method that determines an imbalance parameter that characterizes an imbalance between signal paths of the receiver of FIG. 7, in accordance with an embodiment.

FIG. 11 is a flow chart illustrating a method 140 that determines an imbalance parameter that characterizes an imbalance between the I signal path 68 and the Q signal path 70, according to embodiments of the present disclosure. In some embodiments, the method 140 may be implemented at least in part by executing instructions stored in a tangible, non-transitory, computer-readable medium, such as the memory 14, using processing circuitry, such as processors 12, or the like. However, as described herein, the method 140 is described as being performed by the imbalance compensation logic 84.

At block 142, the imbalance compensation logic 84 may receive unbiased representations of a first input radio frequency signal from quadrature generation circuit 56. The imbalance compensation logic 84 may receive consecutive digitalized symbols (e.g., digital samples) of a received carrier waveform 66 (e.g., analog signal) from the ADC 58. The imbalance compensation logic 84 may transmit the digital samples corresponding to the received carrier waveform 66 on an I signal path 68 and a separate Q signal path 70 to the imbalance compensation logic 84. At or before being received at the imbalance compensation logic 84, the digital samples may be divided into subgroups, each corresponding to time periods. An average magnitude may be determined for each respective subgroup. The time periods by which the digital samples are divided may correspond to periods of the carrier waveform 66. The imbalance compensation logic 84 may subtract the average magnitude of the carrier waveform 66 from the carrier waveform 66 to remove the DC offset applied by the DC offset circuit 72 and/or DC leak of the electronic device 10. The unbiased representations of the first input radio frequency signal (e.g., carrier waveform 66) may include digital samples that have had a DC offset of the DC offset circuit 72 removed. The imbalance compensation logic 84 may remove DC offset and/or the DC leak in accordance with the relationship described by Equation 1, which shows a difference between a noise waveform (i.e., v(n)) and a mean amplitude of the noise waveform (i.e., mean(v)), being used to generate unbiased representations of the first input radio frequency signal (i.e., $V_{unbiased}(n)$).

$$V_{unbiased}(n) = v(n) - \text{mean}(v(n)) \qquad [1]$$

Determining the DC offset may thus include determining an average over a complete cycle of the first input radio frequency signal such as to determine a residual DC offset value. In some cases, the imbalance compensation logic 84 may receive the DC offset value and generate an unbiased representation of the noise waveform, v(n), or other input waveform used to determine an imbalance between the I signal path 68 and Q signal path 70 using (e.g., by subtracting) the received DC offset value. In some embodiments, the DC offset may be removed from the first input radio frequency signal before being received by the imbalance compensation logic 84. In alternative or additional embodiments, the imbalance compensation logic 84 may not remove the DC offset from the first input radio frequency signal before generating unbiased representations of the first input radio frequency signal because, for example, the DC offset circuit 72 removes the DC offset on behalf of the imbalance compensation logic 84, there is no DC offset applied to the first input radio frequency signal in the first place, and so on.

At block 144, the imbalance compensation logic 84 may alter the unbiased representations by squaring the unbiased representations to generate unbiased exponential representations. This may include exponentially increasing each unbiased representation of each symbol by a magnitude of two to obtain an exponential representation of each unbiased representation of the first input radio frequency signal.

At block 146, the imbalance compensation logic 84 may alter the unbiased exponential representations at least in part by multiplying the unbiased exponential representations by conjugate representations of the unbiased exponential representations to generate unbiased exponential conjugations of the first input radio frequency signal.

At block 148, the imbalance compensation logic 84 may generate a first summation of the unbiased exponential representations and generate a second summation of the unbiased exponential conjugations. The results from operations of block 144 and block 146 may be stored by the imbalance compensation logic 84 in a memory and/or a buffer for retrieval during operations of block 148. The first summation and the second summation may enable the IQ imbalance to be detectable, even in cases where the original consecutive digitalized symbols (e.g., digital samples evidencing the IQ imbalance) of a received carrier waveform 66 (e.g., an analog noise signal) from the ADC 58 have relatively small amplitudes, since the summations provide a boost in power to the signals (e.g., amplification of the IQ imbalance in the noise signal via squaring of the noise signal). In particular, other components of a noise signal may be smaller in amplitude in comparison to the IQ imbalance components. As such, squaring (or otherwise increasing) the noise signal may enable the IQ imbalance components within the noise signal to be amplified compared to other signal components, thus making the IQ imbalance components easier to identify, remove, and/or compensate for, improving the determination of imbalance parameter (i.e., ε) and making the determination more accurate.

Using the first summation and the second summation, at block 150, the imbalance compensation logic 84 may divide the first summation by the second summation to determine an intermediate quotient as the imbalance parameter. Here, the imbalance compensation logic 84 may divide the first summation by a total power (represented via the second summation) to determine the imbalance parameter. In some cases, at block 152, the imbalance compensation logic 84 may also multiply the intermediate quotient by a factor to determine an imbalance parameter. The operations of block 144, block 146, block 148, and block 150 may be summarized via a relationship described by Equation 2, which shows summations of the unbiased representations of the first input radio frequency signal (i.e., $V_{unbiased}(n)$) and the conjugates of the unbiased representations of the first input radio frequency signal (i.e., $V^*_{unbiased}(n)$) being used to determine an imbalance parameter (i.e., ε).

$$\text{Imbalance parameter}, \varepsilon = \frac{1}{2} \frac{\sum [V_{unbiased}(n) \times V_{unbiased}(n)]}{\sum [V^*_{unbiased}(n) \times V_{unbiased}(n)]} \qquad [2]$$

Using the imbalance parameters determined via operations of block 152, the imbalance compensation logic 84, at block 154, may determine a phase and/or magnitude of the imbalance based at least in part on the imbalance parameter. For example, the imbalance parameter (i.e., ε) may be converted into an imaginary number (e.g., image) and applied to the relationship described by Equation 3 to determine the imbalance phase (i.e., θ) while a real version of the imbalance parameter may be used to determine the imbalance magnitude (i.e., a) according to Equation 4.

$$\theta = \frac{-2 * \text{atan}(\text{image}[\varepsilon])}{180 * \pi} \qquad [3]$$

$$\alpha = 10 \log_{10}(1 + \text{real}(\varepsilon)) \qquad [4]$$

When determining the one or more correction values, at block 126, the imbalance compensation logic 84 may reference a look-up table defining an adjustment to be applied to the quadrature generation circuit. The look-up table may include combinations of phase amounts and magnitude amounts, such that a particularly determined combination of phase and magnitude may be used to identify the one or more correction values. In some examples, the imbalance compensation logic 84 may adjust the phase and/or magnitude in the hardware of the receiver 50. For example, one or both of the mixers 74 may be adjusted for a different phase and/or magnitude in response to determined correction values. Furthermore, in some examples, the imbalance compensation logic 84 may make a correction in a baseband on digitized signals, such as the unbiased representations of the first input radio frequency signal discussed at block 142 (e.g., consecutive digitalized symbols). For instance, one way to correct the digitized signals after estimating the imbalance parameter (i.e., ε) is by finding a difference between an unbiased voltage ($V_{unbiased}(n)$) and a conjugate of an unbiased voltage ($V^*_{unbiased}(n)$) that is scaled by the imbalance parameter (ε) (e.g., $\varepsilon V^*_{unbiased}(n)$). This relationship is shown in Equation 5.

$$V_{unbiased\_corrected}(n) = V_{unbiased}(n) - \varepsilon V^*_{unbiased}(n) \qquad [5]$$

The methods described above may be performed on a single batch of received data of the input radio frequency signal and/or over multiple batches of received data of the input radio frequency signal. In this way, the imbalance compensation logic 84 may apply a correction and/or adjust operation of the receiver 50 in response to a phase and/or magnitude of the imbalance determined from a single batch of received data of the input radio frequency signal. Over time, the imbalance compensation logic 84 may continue to refine its adjustments to the receiver 50 in response to updated determinations of the phase and/or magnitude of the imbalance. For example, the imbalance compensation logic 84 may continue to operate in an imbalance sensing operational mode until a suitable number (e.g., a threshold number) of samples (e.g., digital values) of the input radio frequency signal. In some cases, collection of samples may be performed for a period of time and paused (e.g., not occur) for a period of time. Eventually, collection of the samples may continue to be collected for another period of time. Once the suitable number of samples have been collected, the imbalance compensation logic 84 may operate according to the method 120 and the method 140 to effectively compensate for IQ imbalance and improve operation of the receiver 50 based on the various sets of samples gathered.

In some cases, the imbalance compensation logic 84 may determine one or more correction values that compensate for the imbalance such that the imbalance is reduced to a magnitude, a, at least equal to −50 decibels or lower. The adjustment of the imbalance to a suitably low amount may occur within a particular number of operational cycles (e.g., performances of the method 120 and method 140). For example, to lower the imbalance to −50 decibels within two sampling operations, the imbalance compensation logic 84 may perform the method 120 a first time to determine a first imbalance and may repeat performance of the method 120 on subsequent input radio frequency signal data to determine a second imbalance that refines the first imbalance (e.g., reduces the first imbalance to the second imbalance). In some cases, the adjustment of the imbalance to −50 decibels or less may happen in three operational cycles (e.g., three iterations of a method used to determine the imbalance). Although described herein with respect to demodulation operations of the receiver 50, it should be understood that the disclosed methods may be applied to quadrature signals generated during modulation operations of a transmitter.

Thus, the technical effects of the present disclosure include systems and methods for determining an imbalance between two signal paths of a receiver. By using the systems and methods described herein, the imbalance may be reduced to at least as low as −50 decibels (e.g., −60 decibels) and be compensated for in the time domain (e.g., not in the imaginary and/or phasor domain). Furthermore, the imbalance reduction benefits may be applied over time, such as during actual operation or deployment of the electronic device rather than just during manufacturing of the electronic device. This may enable the electronic device to sustain desirable performance over its lifespan. Additionally, the imbalance determination operation may be performed internal to the electronic device without the use of external test equipment. In some embodiments, the imbalance sensing circuit may be combined with the processing circuitry of the electronic device, further improving imbalance determination operations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A communication device, comprising:
quadrature generation circuitry configured to
receive a first input radio frequency signal,
adjust an average value of the first input radio frequency signal using a direct current offset block, and
generate quadrature waveforms using the first input radio frequency signal with the adjusted average value using the direct current offset block;
an analog-to-digital converter configured to convert the quadrature waveforms into digital signals; and
an imbalance compensation logic configured to
separate the digital signals into discrete components,
determine an imbalance between the quadrature waveforms due to asymmetric signal pathing of the quadrature waveforms in the quadrature generation circuitry by summing unbiased exponential representations of the discrete components of the digital signals,
determine one or more correction values that compensate for the imbalance, and
apply the one or more correction values to a second input radio frequency signal received from a transmitter.

2. The communication device of claim 1, wherein the quadrature generation circuitry comprises at least two mixers and at least two intermediate filters configured to convert the first input radio frequency signal into the quadrature waveforms, and wherein the quadrature waveforms comprise an in-phase waveform and a quadrature waveform for transmission to the analog-to-digital converter.

3. The communication device of claim 2, wherein the first input radio frequency signal comprises noise received at the communication device and does not include a test signal.

4. The communication device of claim 1, wherein the imbalance compensation logic is configured to determine the imbalance between the quadrature waveforms at least in part by:
receiving the quadrature waveforms from the quadrature generation circuitry;
generating a plurality of unbiased representations of the quadrature waveforms at least in part by subtracting an average waveform from the quadrature waveforms; and
squaring each of the plurality of unbiased representations to generate the unbiased exponential representations.

5. The communication device of claim 4, wherein the imbalance compensation logic is configured to determine the imbalance between the quadrature waveforms at least in part by determining a ratio between a summation of the unbiased exponential representations and a summation of unbiased exponential conjugations.

6. The communication device of claim 1, wherein the imbalance compensation logic is configured to determine the imbalance between the quadrature waveforms at least in part by:
receiving the quadrature waveforms from the quadrature generation circuitry;
generating a plurality of unbiased representations of the quadrature waveforms using the quadrature waveforms and the direct current offset block;
altering the plurality of unbiased representations by squaring the plurality of unbiased representations to generate the unbiased exponential representations;
generating a first summation of the unbiased exponential representations;
altering the plurality of unbiased representations at least in part by multiplying the plurality of unbiased representations by conjugate representations of the plurality of unbiased representations to generate unbiased exponential conjugations;
generating a second summation of the unbiased exponential conjugations;
dividing the first summation by the second summation to determine an intermediate quotient;
multiplying the intermediate quotient by a factor to determine an imbalance parameter; and
determining the imbalance based at least in part on the imbalance parameter.

7. The communication device of claim 6, wherein the second summation characterizes a total power associated with at least a portion of the unbiased exponential conjugations.

8. The communication device of claim 6, wherein the imbalance compensation logic is configured to:
determine a phase, a magnitude, or both, of the imbalance using the imbalance parameter; and
use the phase, the magnitude, or both, of the imbalance to determine the one or more correction values.

9. The communication device of claim 8, wherein separating the digital signals into the discrete components is based at least in part on a frequency of the quadrature waveforms, and wherein the frequency of the quadrature waveforms is related to a complete cycle.

10. A method, comprising:
receiving noise as an input radio frequency signal via an antenna;
adjusting a mean value of the input radio frequency signal using a direct current offset;
converting the input radio frequency signal having the adjusted mean value into quadrature signal components;
transmitting the quadrature signal components to an imbalance compensation logic to determine an imbalance between the quadrature signal components;
receiving an indication of the imbalance between the quadrature signal components from the imbalance compensation logic;
determining one or more correction values that compensate for the imbalance; and
applying the one or more correction values to adjust a second input radio frequency signal received from a transmitter via the antenna.

11. The method of claim 10, comprising:
converting the quadrature signal components into a digital representation of the quadrature signal components; and
transmitting the digital representation of the quadrature signal components to the imbalance compensation logic.

12. The method of claim 11, wherein receiving the indication of the imbalance between the quadrature signal components comprises receiving an imbalance phase and an imbalance magnitude determined based at least in part on an imbalance parameter derived from the digital representation of the quadrature signal components.

13. The method of claim 12, wherein determining the one or more correction values comprises referencing a look-up table defining an adjustment to be applied to a quadrature generation circuit based at least in part on a value of the imbalance phase and of a value of the imbalance magnitude.

14. The method of claim 12, wherein determining the one or more correction values comprises:
generating a value of the imbalance phase and a value of the imbalance magnitude based at least in part on a summation of unbiased exponential representations and a summation of unbiased exponential conjugations; and
determining a phase adjustment to apply to a phase delay circuit based at least in part on a value of the imbalance phase and of a value of the imbalance magnitude.

15. At least one tangible, non-transitory, and machine-readable medium, comprising machine-readable instructions stored thereon that, when executed by at least one processor, cause the at least one processor to:
operate radio frequency circuitry to increase an amount of noise received by an antenna;
receive a quadrature waveform based at least in part on a first input radio frequency signal having a mean value that was adjusted using a direct current offset block, wherein the first input radio frequency signal is received at the radio frequency circuitry when operated to increase the amount of noise received by the antenna, wherein the quadrature waveform is out of phase from a reference waveform by a first degree amount;
determine an imbalance between the quadrature waveform and the reference waveform by summing unbiased exponential representations of the quadrature waveform, wherein the imbalance is caused at least in part by asymmetric signal pathing of the quadrature waveform through a receiver relative to a signal path of the reference waveform through the receiver, and wherein the imbalance is indicative of the first degree amount;
determine one or more correction values that compensate for the imbalance; and apply the one or more correction values to a second input radio frequency signal received from a transmitter to reduce the first degree amount to a second degree amount.

16. The at least one machine-readable medium of claim 15, comprising instructions that cause the at least one processor to determine the one or more correction values that compensate for the imbalance by adjusting an operation of the receiver to compensate for the imbalance, wherein the at least one processor determines the imbalance based at least in part on an indication of a total power associated with at least a portion of unbiased exponential conjugations generated from the quadrature waveform.

17. The at least one machine-readable medium of claim 16, comprising instructions that cause the at least one processor to determine the one or more correction values that compensate for the imbalance by adjusting an operation of one or more components of the receiver to compensate for the imbalance based at least in part on a magnitude of the imbalance and a phase of the imbalance.

18. The at least one machine-readable medium of claim 15, comprising instructions that cause the at least one processor to determine the one or more correction values that compensate for the imbalance to reduce the imbalance to a value of −50 decibels or lower.

19. The at least one machine-readable medium of claim 18, comprising instructions that cause the at least one processor to determine the one or more correction values that compensate for the imbalance such that the imbalance is reduced to a value at least −50 decibels or lower within three iterations of a method used to determine the imbalance.

20. The at least one machine-readable medium of claim 15, comprising instructions that cause the at least one processor to determine the one or more correction values that compensate for the imbalance such that the imbalance is reduced to a value at least −50 decibels or lower within two sampling operations, wherein a first sampling operation of the two sampling operations is associated with determining the imbalance and a second sampling operation of the two sampling operations is associated with refining the imbalance.

* * * * *